(12) United States Patent
Henderkott

(10) Patent No.: US 12,447,545 B2
(45) Date of Patent: Oct. 21, 2025

(54) PRE-SINTERED PREFORM BRAZE REINFORCEMENT OF PRESSURE VESSELS

(71) Applicant: Rolls-Royce Corporation, Indianapolis, IN (US)

(72) Inventor: Joseph Peter Henderkott, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/664,969

(22) Filed: May 15, 2024

(65) Prior Publication Data

US 2024/0293883 A1    Sep. 5, 2024

Related U.S. Application Data

(62) Division of application No. 16/733,430, filed on Jan. 3, 2020, now Pat. No. 11,999,000.

(51) Int. Cl.
*B23K 1/00*        (2006.01)
*B22F 5/00*        (2006.01)
(Continued)

(52) U.S. Cl.
CPC ............ B23K 1/0018 (2013.01); B22F 5/009 (2013.01); B22F 7/008 (2013.01); B22F 7/08 (2013.01);
(Continued)

(58) Field of Classification Search
CPC ....... B23K 31/025; B23K 1/0018; B22F 7/02; B22F 7/04; B22F 2007/072; B22F 2007/06–062; B32B 2305/08
See application file for complete search history.

(56) References Cited

U.S. PATENT DOCUMENTS

| 5,666,643 A | 9/1997 | Chesnes et al. |
| 2005/0166397 A1* | 8/2005 | Ng ............... B23K 35/0238 29/889.1 |

(Continued)

FOREIGN PATENT DOCUMENTS

JP        05212577 A  *  8/1993

OTHER PUBLICATIONS

Fire Control Man, "Combustor Liners", 2022, pp. 6-12, (Applicant points out, in accordance with MPEP 609.04 (a), that the year of publication, 2022, is sufficiently earlier than the effective U.S. filing date, so that the particular month of publication is not an issue.). Retrieved from the Internet on Dec. 8, 2022 from URL: https://firecontrolman.tpub.com/14104/css/Combustor-Liner-96.htm.

(Continued)

*Primary Examiner* — Sally A Merkling
*Assistant Examiner* — Austin Pollock
(74) *Attorney, Agent, or Firm* — Shumaker & Sieffert, P.A.

(57) ABSTRACT

The disclosure describes assemblies, systems, and techniques for reinforcing complex geometries of pressure vessels using a pre-sintered preform (PSP) braze material that includes a low-melt powder and a high-melt powder. An example component includes a substrate comprising at least a portion of a pressure vessel. The substrate defines a contoured exterior surface of the pressure vessel. The component includes a pre-sintered preform (PSP) reinforcement formed on the surface of the substrate by brazing, wherein the PSP reinforcement comprises a low-melt powder and a high-melt powder.

11 Claims, 4 Drawing Sheets

(51) Int. Cl.
- *B22F 7/00* (2006.01)
- *B22F 7/04* (2006.01)
- *B22F 7/08* (2006.01)
- *B23K 1/008* (2006.01)
- *B23K 31/02* (2006.01)
- *B23K 103/02* (2006.01)
- *B23K 103/08* (2006.01)
- *C22C 19/05* (2006.01)
- *F17C 1/02* (2006.01)

(52) U.S. Cl.
CPC ............ *B23K 31/025* (2013.01); *C22C 19/05* (2013.01); *C22C 19/056* (2013.01); *C22C 19/057* (2013.01); *C22C 19/058* (2013.01); *F17C 1/02* (2013.01); *B22F 2007/042* (2013.01); *B22F 2301/15* (2013.01); *B22F 2301/35* (2013.01); *B22F 2303/30* (2013.01); *B23K 1/008* (2013.01); *B23K 2103/02* (2018.08); *B23K 2103/08* (2018.08)

(56) References Cited

U.S. PATENT DOCUMENTS

| | | |
|---|---|---|
| 2006/0117562 A1 | 6/2006 | Subramanian et al. |
| 2007/0154338 A1 | 7/2007 | Sathian et al. |
| 2008/0017694 A1 | 1/2008 | Schnell |
| 2008/0166233 A1 | 7/2008 | Johnson et al. |
| 2008/0210741 A1 | 9/2008 | Thompson et al. |
| 2009/0263676 A1* | 10/2009 | Litzenberger ........ B23K 20/122 228/115 |
| 2010/0224600 A1 | 9/2010 | Anton et al. |
| 2012/0233859 A1* | 9/2012 | Cattiez ................. B23K 11/004 29/889.7 |
| 2012/0308843 A1 | 12/2012 | Ott et al. |
| 2014/0154082 A1 | 6/2014 | Shinn et al. |
| 2014/0212681 A1 | 7/2014 | Cui et al. |
| 2015/0129564 A1 | 5/2015 | Kadau et al. |
| 2015/0367456 A1 | 12/2015 | Ozbaysal et al. |
| 2015/0375322 A1 | 12/2015 | Salm et al. |
| 2015/0377037 A1 | 12/2015 | Salm et al. |
| 2016/0199930 A1 | 7/2016 | Yarbrough |
| 2016/0339544 A1 | 11/2016 | Xu et al. |
| 2017/0122562 A1 | 5/2017 | Berry |
| 2017/0306775 A1 | 10/2017 | Hoskin |
| 2018/0311728 A1 | 11/2018 | Kottilingam et al. |
| 2019/0039141 A1* | 2/2019 | Cui ........................ B22F 3/162 |
| 2021/0205909 A1 | 7/2021 | Henderkott |

OTHER PUBLICATIONS

Flight Safety Australia; "Big Bang Theory"; https : 1/www.flightsafetyaustralia.com/2016/12/big-bang-theory/; retrieved from internet on Jun. 12, 2023; Dec. 12, 2016 (Year: 2016).

Prosecution History from U.S. Appl. No. 16/733,430, dated May 13, 2022 through Feb. 1, 2024, 98 pp.

* cited by examiner

PRE-SINTERED PREFORM BRAZE REINFORCEMENT OF PRESSURE VESSELS

This application is a divisional filing of U.S. patent application Ser. No. 16/733,430, filed 3 Jan. 2020, the entire contents of which is incorporated herein by reference.

TECHNICAL FIELD

The present disclosure generally relates to brazes for reinforcing pressure vessels.

BACKGROUND

Pressure vessels, such as pressure vessels of high temperature mechanical systems, may benefit from one or more structural reinforcements positioned at locations of the component that experience increased stresses during operation. An example pressure vessel of high temperature mechanical system may include combustion chambers of gas turbine engines.

SUMMARY

In some examples, the disclosure describes a method that includes positioning a pre-sintered preform (PSP) reinforcement on a surface of a substrate. The substrate includes at least a portion of a pressure vessel. The PSP reinforcement includes a low-melt powder and a high-melt powder. The method also includes heating the PSP reinforcement to soften or melt at least one constituent metal or alloy of the low-melt powder. During heating, the PSP reinforcement is configured to conform to a contour of the surface of the substrate. The method also includes cooling the PSP reinforcement to define a reinforced component.

In some examples, the disclosure describes a component that includes a substrate and a PSP reinforcement. The substrate includes at least a portion of a pressure vessel and defines a contoured exterior surface of the pressure vessel. The PSP reinforcement includes a low-melt powder and a high-melt powder and is formed on the surface of the substrate by brazing.

In some examples, the disclosure describes an assembly that includes a substrate, a pre-sintered preform (PSP) reinforcement, and a heat source. The substrate defines a surface of at least a portion of a pressure vessel. The PSP reinforcement positioned on the surface of the substrate. The PSP reinforcement comprises a low-melt powder and a high-melt powder. The heat source is configured to heat the PSP reinforcement to soften or melt at least one constituent metal or alloy of the low-melt powder. During heating, the PSP reinforcement is configured to conform to a contour of the surface of the substrate.

The details of one or more examples are set forth in the accompanying drawings and the description below. Other features, objects, and advantages will be apparent from the description and drawings, and from the claims.

DETAILED DESCRIPTION

Figure 1:
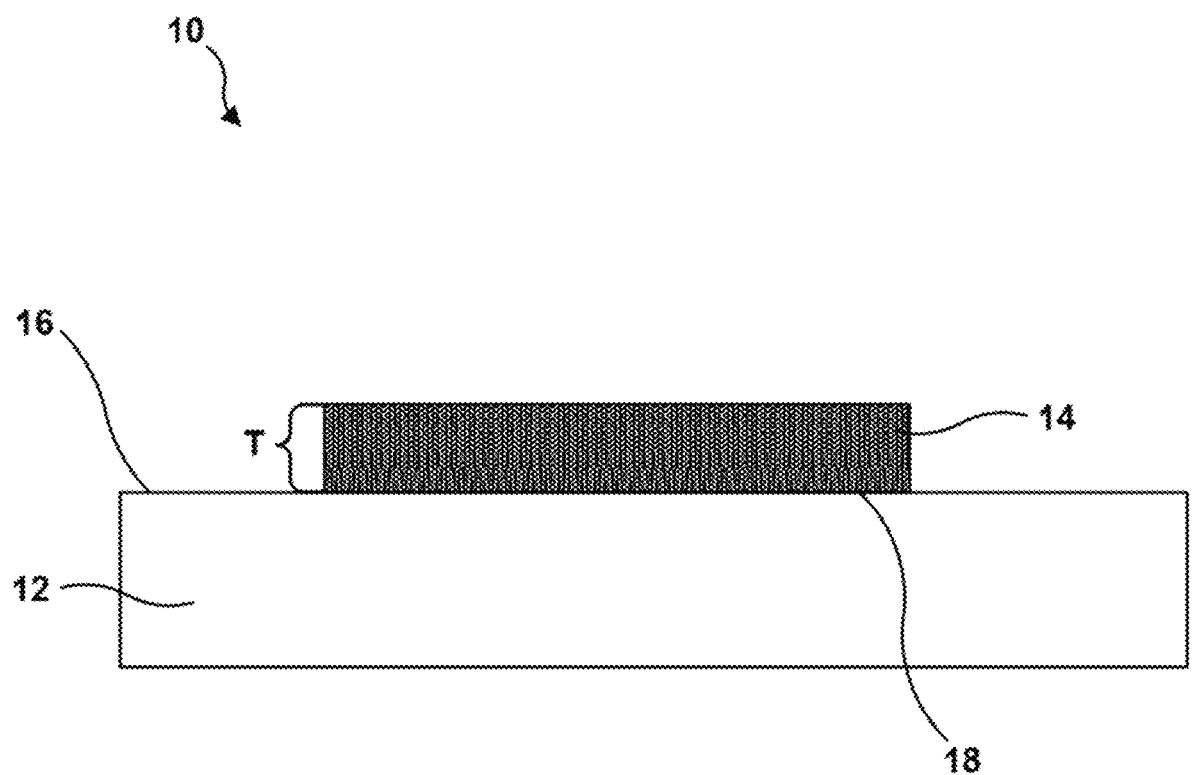
FIG. 1 is a conceptual and schematic diagram illustrating an example component including a substrate and a reinforcement formed on the substrate using a pre-sintered preform (PSP) braze material.

The disclosure describes assemblies, systems, and techniques for reinforcing complex geometries of pressure vessels using a pre-sintered preform (PSP) braze material. In some examples, the PSP braze material may include a conforming braze material powder that has been sintered to reduce porosity. The conforming braze material may include, for example, a Ni-based, Fe-based, or Co-based conforming braze material.

Pre-sintered preforms (PSPs) may be used to reinforce selected areas of pressure vessels. An example structural reinforcement (e.g., localized patch) for pressurizable aerospace components may include an armpit patch on an outer combustion chamber (OCC) of a gas turbine engine, such as an M250 gas turbine engine available from Rolls Royce Corporation, Indianapolis, Indiana. In some examples, the components may include high performance alloy components, Ni-based alloy components, Fe-based alloy components, Co-based alloy components, or the like.

The PSPs may be formed in any suitable shape to at least partially conform to a contour (e.g., three-dimensional geometry) of a region of the component to be reinforced. For example, a PSP may include formed sheets, rings, or other geometries. PSPs typically include a sintered powder metallurgy product composed of a substantially homogeneous mixture of a high-melt powder and a low-melt powder. The high-melt powder includes a base metal or alloy having a melting temperature greater than the low-melt powder and/or a material of the component to which the PSP is added. The low-melt powder includes a braze alloy having a melting temperature less than the high-melt powder and/or a material of the component to which the PSP is added. During brazing, at least a portion of the low-melt powder is softened and/or melted to bond both with the high-melt powder and the component. Pre-sintering the PSP may reduce changes to geometry and internal porosity of the PSP during brazing.

In some examples, the PSP composition, after brazing, results in an alloy that has properties suitable for use in high temperature oxidative environments (e.g., mechanical strength and high temperature oxidation resistance). For example, the PSP composition may include a Ni-based alloy, Fe-based alloy, or a Co-based alloy. In some examples, the PSP composition may include at least one of Al, Ti, Cr, W, Mo, Re, Ta, Si, B, or Fe.

The use of presintered preforms (PSPs) for material addition, such as application of structural reinforcements on a component, may include several advantages over other material addition techniques, such as via build-up of braze material on a reinforcing element, such as a metal mesh. These advantages may include, for example, improved process repeatability and reliability, reduced cost, reduced machining time after repair, reduced braze flash clean-up, use of a reduced number of braze cycles, improvements in joint and/or bonding strength, or combinations thereof.

Additionally, or alternatively, the reduced amount of braze flow and improved dimensional soundness of the PSP, e.g., relative to other techniques that do not use a PSP, enables material addition on pressure vessels to form structural reinforcements.

FIG. 1 is a conceptual and schematic diagram illustrating an example component 10 including a substrate 12 of and reinforcement 14 formed on substrate 12 using a pre-sintered preform (PSP) braze material. In some examples, component 10 may define an article or a portion of an article that is part of a high temperature mechanical system. For example, component 10 may include a pressure vessel of a gas turbine engine, such as an outer combustion chamber. In other examples, component 10 may include another component of a high temperature mechanical system, such as another component of a gas turbine engine, such as, for example, a gas turbine engine blade, gas turbine engine vane, blade track, combustor liner, or the like.

Substrate 12 may include a metal or alloy formed using, for example, casting, forging, powder metallurgy, and/or additive manufacturing. In some examples, substrate 12 may include a Ni-, Co-, Fe-based high temperature alloy; Hastelloy® X, Hastelloy® W, or Haynes® 230 available from Haynes International, Kokomo, Indiana; Stellite® 31 (e.g., X-40) available from Kennametal, Latrode, Pennsylvania; or the like. In some examples, substrate 12 may include a Ni-, Co-, Fe-based superalloy, or the like. In examples in which substrate 12 includes a superalloy, substrate 12 may include other additive elements to alter its mechanical and chemical properties, such as toughness, hardness, temperature stability, corrosion resistance, oxidation resistance, and the like, as is known in the art. Any useful superalloy may be utilized in substrate 12, including, for example, Ni-based alloys, such as MAR-M246 ® or MAR-M247®, available from Martin-Marietta Corp., Bethesda, Maryland; Ni-based alloys, such as CMSX-3®, CMSX-4®, CMSX-10®, and CM-186®, available from Cannon-Muskegon Corp., Muskegon, Michigan; Co-based alloys, such as MAR-M509®, available from Martin-Marietta Corp., Bethesda, Maryland; and the like.

Substrate 12 defines a surface 16 on which a surface 18 of reinforcement 14 may be disposed. Although FIG. 1 illustrates substrate 12 and reinforcement 14 as each defining a simple, substantially rectangular geometry, in other examples, substrate 12 and/or reinforcement 14 may define a more complex geometry, multiple planes or surfaces, simple or complex curves, seams, or the like.

Reinforcement 14 includes a mixture of powder PSP braze material that has been sintered to form a pre-sintered preform. Sintering may reduce porosity compared to the powder, which may reduce porosity in reinforcement 14 during and after brazing. In some examples, the mixture of powder PSP braze material defining reinforcement 14 (described herein as, "PSP reinforcement 14") may include a conforming braze material, such as Ni-based, Fe-based, or Co-based wide gap braze alloy. A conforming braze material may include a composition of metal or alloy powders configured to sufficiently soften to conform to surface contours of a substrate and reduce gross liquidation and/or flow of the constituents of the conforming braze material that are melted during brazing. By conforming to surface contours of a substrate, a conforming braze material may improve substrate/reinforcement contact, improve bond strength, or both. By reducing gross liquidation and/or reflow, a conforming braze material may be used, for example, to reinforce a component that includes cooling holes (or other features) into (or onto) which other braze materials may flow during brazing. In these ways, a conforming braze material may be configured to, during brazing, conform to surface contours of a substrate having a complex geometry without flowing off the substrate or otherwise deforming in shape.

In some examples, PSP reinforcement 14 may include greater amounts of alloying elements than braze powders, braze foils, braze tapes, or other braze materials. The greater amounts of alloying elements may contribute to improved mechanical properties, chemical properties, or both compared to other braze materials. For example, reinforcement 14, after brazing, may possess sufficient mechanical strength and high temperature oxidation resistance to be used to reinforce a pressure vessel of a gas turbine engine, such as an outer combustion chamber.

In some examples, PSP reinforcement 14 may include both a braze alloy powder (e.g., a low-melt powder composition) and a superalloy powder (e.g., a high-melt powder composition). The low-melt alloy powder composition is an alloy, or a mixture of alloys, that substantially melts below a braze temperature. In contrast, the high-melt alloy powder composition is an alloy, or a mixture of alloys, that remains substantially unmelted at the braze temperature, because the composition has a melting temperature above the braze temperature. In some examples, the braze alloy powder and the superalloy powder may have specific powder mesh sizes, and may be produced by induction melting the braze alloy or the superalloy, respectively, in vacuum or an argon atmosphere, followed by argon gas atomization. Each individual powder component used in PSP reinforcement 14 may be analyzed to confirm, within common metallurgy tolerances, the particle size and chemical compositions.

In some examples, the low-melt powder composition includes an alloy or a mixture of alloys that melt at a temperature below about 1260° C. (about 2300° F.), with the alloy or mixture of alloys being selected so that the low-melt powder composition as a whole substantially melts at a temperature between about 1093° C. (about 2000° F.) and about 1260° C. (about 2300° F.). The high-melt alloy powder composition may include a single high-melt alloy or a mixture of alloys that melts at a temperature of greater than about 1315° C. (about 2400° F.).

In some examples, the low-melt powder composition may include one or more alloy powders and includes between about 50 wt. % and about 70 wt. % Ni, between about 8 wt. % and about 20 wt. % Cr, between about 8 wt. % and about 15 wt. % Ta, between about 4 wt. % and about 10 wt. % Co, between about 2 wt. % and about 7 wt. % Al, up to about 2.25 wt. % B, and up to about 2.25 wt. % Si, and has a compositional melting range of between about 1093° C. (about 2000° F.) and about 1204° C. (about 2200° F.). In some examples, the low-melt powder composition also includes up to about 1 wt. % each of at least one of Ti, W, Mo, Re, Nb, Hf, Pd, Pt, Ir, Ru, C, Si, P, Fe, Ce, La, Y, or Zr. In some examples the low-melt alloy powder comprises a mixture of two or more low-melt alloys. For example, a low-melt alloy powder may include (a) about 35% of a first low-melt powder including about 74 wt. % Ni, about 6 wt. % Cr, about 6 wt. % Al, about 12 wt. % Co, and about 2 wt. % B, with a liquidus temperature of about 1121° C. (about 2050° F.); (b) about 45% of a second low-melt powder including about 42 wt. % Ni, about 31 wt. % Cr, about 26 wt. % Ta, and about 1 wt. % B, with a liquidus temperature of about 1232° C. (about 2250° F.); and (c) about 20 wt. % of a third low-melt powder including about 64 wt. % Ni, about 6 wt. % Al, about 8 wt. % Co, about 4 wt. % W, about 4 wt. % Ta, about 3 wt. % Si, about 1 wt. % Re, about 1 wt.

% Nb, and about 1 wt. % B, with a liquidus temperature of about 1093° C. (about 2000° F.).

In some examples, the high-melt powder composition may include an alloy or mixture of alloys with a chemistry that is the similar to or substantially the same (e.g., the same or nearly the same) as the alloy in substrate 12. For example, in some implementations, when substrate 12 includes a Ni-based superalloy components, such as MAR-M246® or MAR-M247®, or CMSX-3® or CMSX-4®, the high-melt powder composition may include between about 50 wt. % and about 70 wt. % Ni, between about 2 wt. % and about 10 wt. % Cr, between about 2 wt. % and about 10 wt. % Ta, between about 5 wt. % and about 15 wt. % Co, between about 2 wt. % and about 10 wt. % Al, between about 2 wt. % and about 10 wt. % W, between about 2 wt. % and about 4 wt. % Re, up to about 3 wt. % Mo, and up to about 3 wt. % Hf. In some examples, the high-melt powder composition also may include up to about 1 wt. % each of at least one of Ti, Nb, C, B, Si, or Zr. In some examples, the high-melt powder composition includes between about 55 wt. % and about 60 wt. % Ni, about 7 wt. % Cr, about 6 wt. % Ta, about 12 wt. % Co, about 6 wt. % Al, about 3 wt. % Re, about 1.5 wt. % Hf, and about 5 wt. % W.

The low-melt powder composition and the high-melt powder composition may be combined in any selected ratio. In some examples, PSP reinforcement 14 may include a powder mixture consisting of between about 10 wt. % and about 80 wt. %, such as between about 20 wt. % to about 40 wt. %, low-melt powder composition and a balance high-melt powder composition. In some cases, braze alloy powder may be a mixture of two or more braze alloys.

Hence, in some examples, PSP reinforcement 14 may include between about 50 wt. % and about 90 wt. % Ni, up to about 15 wt. % Cr, up to about 10 wt. % Ta, up to about 10 wt. % Co, up to about 7 wt. % Al, up to about 4 wt. % W, up to about 2 wt. % Re, up to about 1 wt. % Mo, up to about 1 wt. % Hf, and, optionally, up to about 0.5 wt. % Nb, up to about 3 wt. % Si, and up to about 3 wt. % B. In some examples, PSP reinforcement 14 may include between about 50 wt. % and about 70 wt. % Ni, between about 10 wt. % and about 15 wt. % Cr, between about 8 wt. % and about 10 wt. % Ta, between about 8 wt. % and about 10 wt. % Co, between about 4 wt. % and about 7 wt. % Al, between about 2 wt. % and about 4 wt. % W, between about 1 wt. % and about 2 wt. % Re, about 1 wt. % Mo, about 1 wt. % Hf, and, optionally, up to about 1% each at least one of Ti, Nb, Pd, Pt, Ir, Ru, C, B, Si, P, Mn, Fe, Ce, La, Y, or Zr. In some examples, PSP reinforcement 14 may include between about 50 wt. % and about 70 wt. % Ni, between about 10 wt. % and about 15 wt. % Cr, between about 8 wt. % and about 10 wt. % Ta, between about 8 wt. % and about 10 wt. % Co, between about 4 wt. % and about 7 wt. % Al, between about 2 wt. % and about 4 wt. % W, between about 1 wt. % and about 2 wt. % Re, between about 0.5 wt. % and about 1 wt. % Mo, between about 0.5 wt. % and about 1 wt. % Hf, between about 0.1 wt. % and about 0.5 wt. % Nb, between about 0.05 wt. % and about 3 wt. % Si, and between about 0.5 wt. % and about 2 wt. % B. In some examples, PSP reinforcement 14 may include about 58 wt. % Ni, about 11 wt. % Cr, about 9 wt. % Ta, about 9 wt. % Co, about 5 wt. % Al, about 3 wt. % W, about 1 wt. % Mo, about 1 wt. % Re, and about 1 wt. % Hf; or may include between about 10.2 wt. % and about 11.3 wt. % Cr, between about 4.8 wt. % and about 5.1 wt. % Al, between about 9.1 wt. % and about 9.8 wt. % Co, between about 2.8 wt. % and about 3.3 wt. % W, between about 0.7 wt. % and about 0.9 wt. % Mo, between about 8.2 wt. % and about 8.8 wt. % Ta, between about 0.6 wt. % and about 0.8 wt. % B, about 0.3 wt. % Si, between about 1.5 wt. % and about 1.8 wt. % Re, between about 0.8 wt. % and about 0.9 wt. % Hf, between about 0.1 wt. % and about 0.2 wt. % Nb, and a balance Ni.

In selecting the proportions of components used in PSP reinforcement 14, higher weight percentages of high-melt powder may provide better mechanical properties in view of their reduced levels of boron, silicon, or both. Conversely, higher percentages of low-melt powders may provide improved braze flow and/or reduce exposure of a substrate to temperatures that may damage the substrate. The composition of the low-melt powder and high-melt powders, as well as the ratios thereof, may be controlled to provide selected brazing characteristics (e.g., flow, diffusion bonding, brazing temperature range, or the like) and selected physical properties (e.g., chemical and mechanical) of the brazed component.

In some examples, a powder composition that includes higher Al content may possess improved high-temperature oxidation resistance properties compared to a powder with lower Al content. In some examples, a powder composition that includes higher Ta content may possess improve mechanical properties compared to lower Ta content. For example, without being bound to any particular theory, Ta may strengthen the gamma and gamma prime phases by increasing lattice mismatches. In some examples, a powder composition that includes a nickel superalloy and about 0.5 wt. % boron may have improved mechanical strength and weldability compared to a nickel superalloy without boron.

In some examples, PSP reinforcement 14 may be formed by mixing one or more braze alloy powders and one or more superalloy powders in a selected composition, then sintering the mixed powder while disposed in a mold to form a sintered preform with reduced porosity. The sintering temperature and the duration of the sintering may depend at least in part on the composition of PSP powder.

In some examples, the sintered powder may then be cut or machined into a predetermined shape. The predetermined shape may correspond to a shape of surface 16 of substrate 12. For example, surface 16 may include a relatively simple geometry or may include a more complex geometry, e.g., multiple planes or surfaces, simple or complex curves, seams, or the like. Accordingly, the sintered powder may be cut or machined into a relatively simple shape, or a more complex, e.g., including curvature, angles, apertures, or the like to form PSP reinforcement 14. Regardless of the complexity of the shape of PSP reinforcement 14 and depending upon the geometry of surface 16, PSP reinforcement 14 may include a substantially two-dimensional shape (e.g., a plane) or a three-dimensional shape (e.g., including curvature, planes at angles with respect to one another, and the like).

In some examples, PSP reinforcement 14 may define a thickness T that is within a range from about 0.381 millimeters (15 thousands of an inch (mil)) to about 25.2 mm (100 mil). In some examples, PSP reinforcement 14 may define a thinner thickness, such as less than about 0.381 mm. In other examples, PSP reinforcement 14 may define a greater thickness, such as greater than about 25.2 mm.

By utilizing PSP reinforcement 14, alloys with desirable mechanical and chemical (e.g., high temperature oxidation resistance) may be applied to substrate 12 using a braze technique to reinforce a portion of substrate 12. The resulting reinforcement 14 may possess sufficient mechanical strength and high temperature oxidation resistance to be use in a high temperature mechanical system, such as a outer combustion chamber of a gas turbine engine. Further, by utilizing a PSP, reinforcement 14 may include reduced porosity compared to a reinforcement formed using a braze powder applied over a metal mesh. Additionally, or alternatively, positioning of PSP reinforcement 14 may be easier and more precise than positioning braze powder applied over a metal mesh. In these ways, PSP reinforcement 14 may facilitate reinforcing substrates used in a high temperature mechanical systems, which may reduce manufacturing time and/or manufacturing cost.

In some examples, although not shown in FIG. 1, an assembly to form component 10 may include a clamp, press, or other mechanism for exerting pressure between surface 16 and surface 18 during a brazing technique. The pressure between surface 16 and surface 18 may facilitate formation of reinforcement 14. For example, the pressure may promote flow of the PSP braze material defining reinforcement 14 and/or evacuate gases or reduce porosity in the PSP braze material defining reinforcement 14.

Figure 2B:
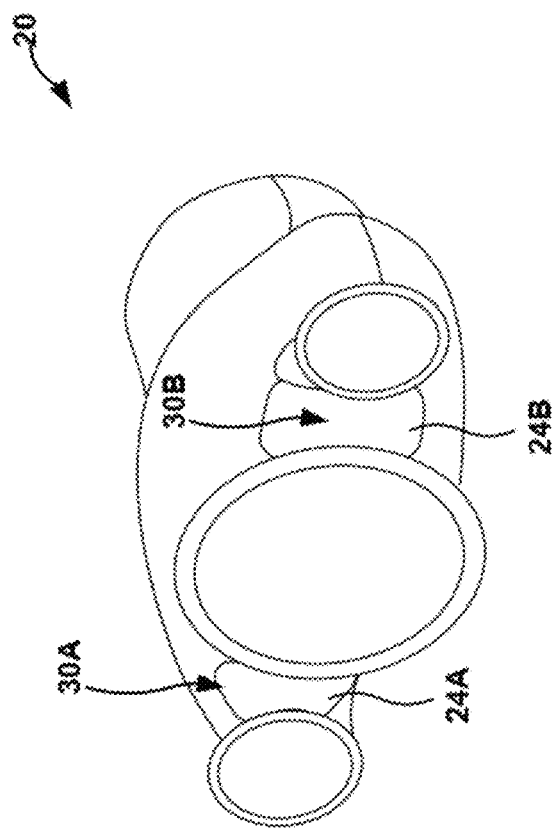
FIGS. 2A and 2B are conceptual diagrams illustrating plan and perspective views of an outer combustion chamber of a gas turbine engine that includes an armpit patch reinforcements formed using pre-sintered preform (PSP) braze material.
Figure 2A:
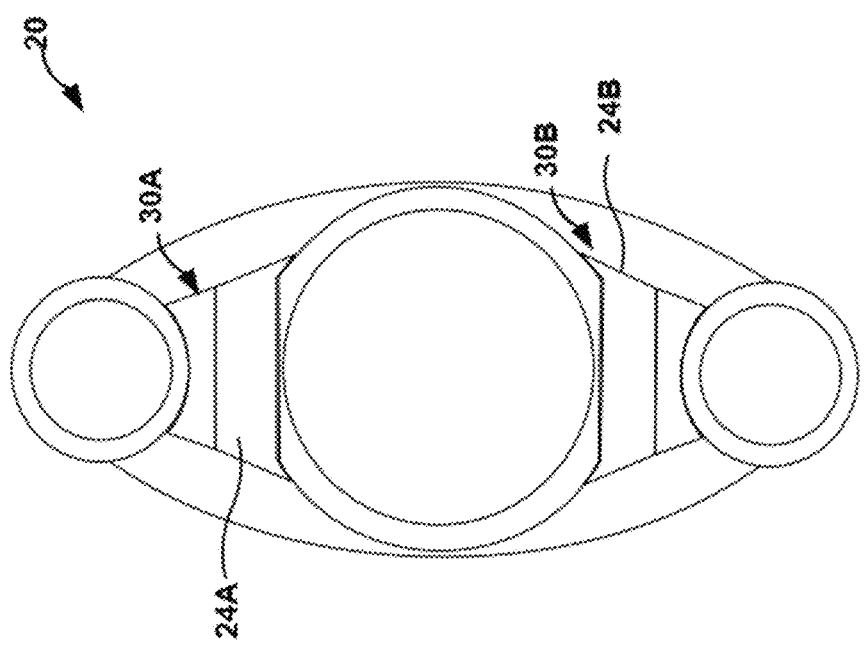

FIGS. 2A and 2B are conceptual diagrams illustrating plan and perspective views of an outer combustion chamber 20 of a gas turbine engine that includes armpit patch reinforcements 24A and 24B formed using pre-sintered preform (PSP) braze material. Outer combustion chamber 20 may include a metal or alloy substrate 22. Substrate 22 may be the same as or substantially similar to substrate 12 discussed above in reference to FIG. 1, except for the differences described herein. Reinforcements 24A and 24B may be the same as or substantially similar to reinforcement 14 discussed above in reference to FIG. 1, except for the differences described herein.

Outer combustion chamber 20 may be formed by any suitable manufacturing technique or combinations thereof. In some examples, outer combustion chamber 20 may include one or more welded seams in armpit regions 30A and 30B. Reinforcements 24A and 24B are configured to provide additional structural support to substrate 22 of outer combustion chamber 20 at armpit regions 30A and 30B. For example, reinforcements 24A and 24B may provide additional structural support of one or more welded seams at armpit regions 30A and 30B. In some examples each of reinforcements 24A and 24B may include two or more lobes or regions.

During operation, outer combustion chamber 20 may be subjected to high temperatures and/or high pressures. In some examples, outer combustion chamber 20 may be subjected to thermal cycling and/or pressure cycling. By reinforcing armpit regions 30A and 30B, reinforcements 24A and 24B may increase a useable life of outer combustion chamber 20.

As discussed above, reinforcements 24A and 24B may be configured to, during brazing, conform to a surface contour of substrate 22 of outer combustion chamber 20. For example, reinforcements 24A and 24B may be pre-formed to generally define a shape corresponding to armpit regions 30A and 30B. However, during brazing, reinforcements 24A and 24B may soften and conform to match or nearly match the contour of armpit region 30A and 30B. In this way, reinforcements 24A and 24B may be easier to form and/or, by softening, form a better bond to armpit regions compared to other reinforcement elements (e.g., metal mesh woven or shaped to conform to the armpit region).

Figure 3A:
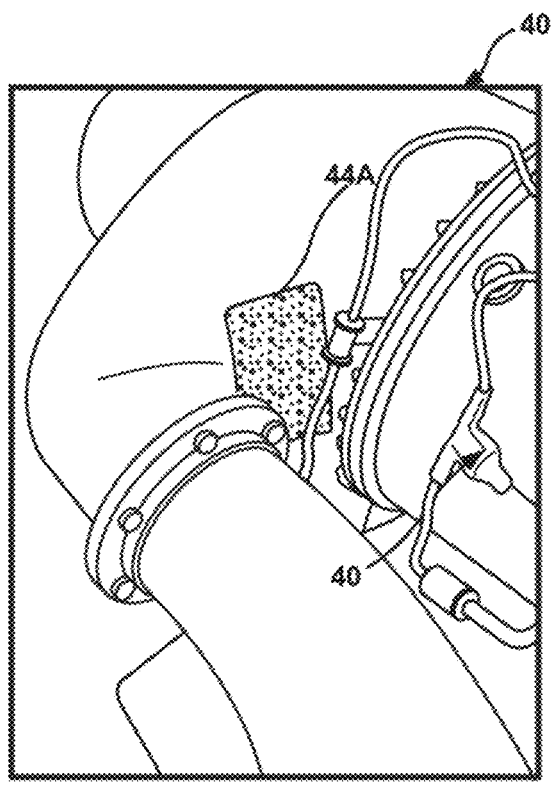
FIGS. 3A and 3B are photographs illustrating an example outer combustion chamber of a gas turbine engine that includes an armpit patch reinforcement formed using pre-sintered preform (PSP) braze material.
Figure 3B:
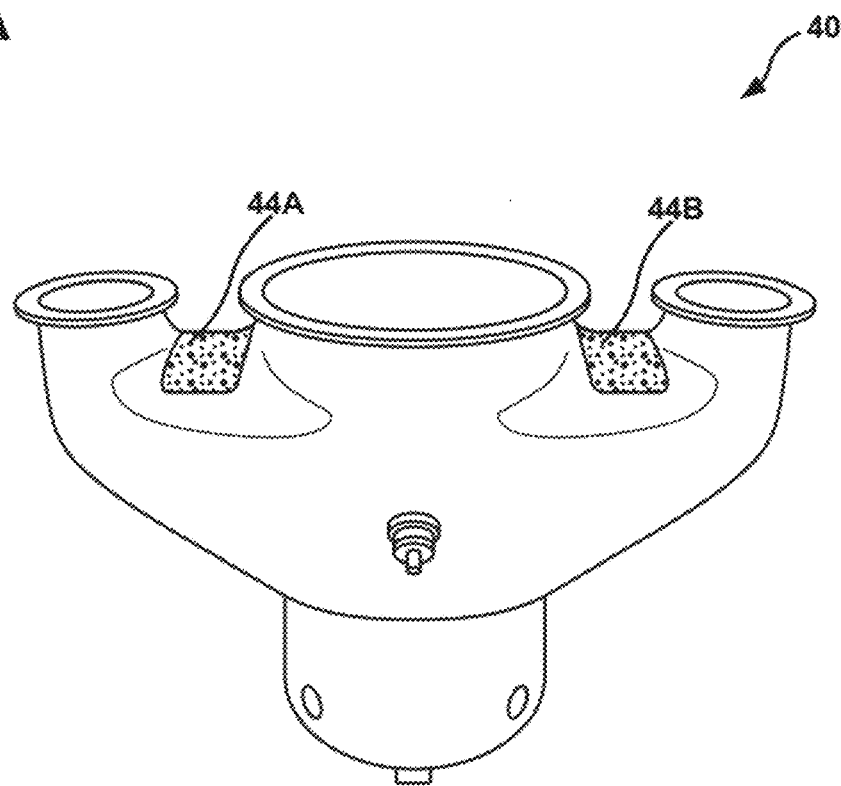

FIGS. 3A and 3B are photographs illustrating an example outer combustion chamber 40 of a gas turbine engine 42 that includes an armpit patch reinforcements 44A and 44B formed using pre-sintered preform (PSP) braze material. Outer combustion chamber 40 and reinforcements 44A and 44B may be the same as or substantially similar to outer combustion chamber 20 and reinforcements 24A and 24B, respectively, as discussed above in reference to FIGS. 2A and 2B.

Figure 4:
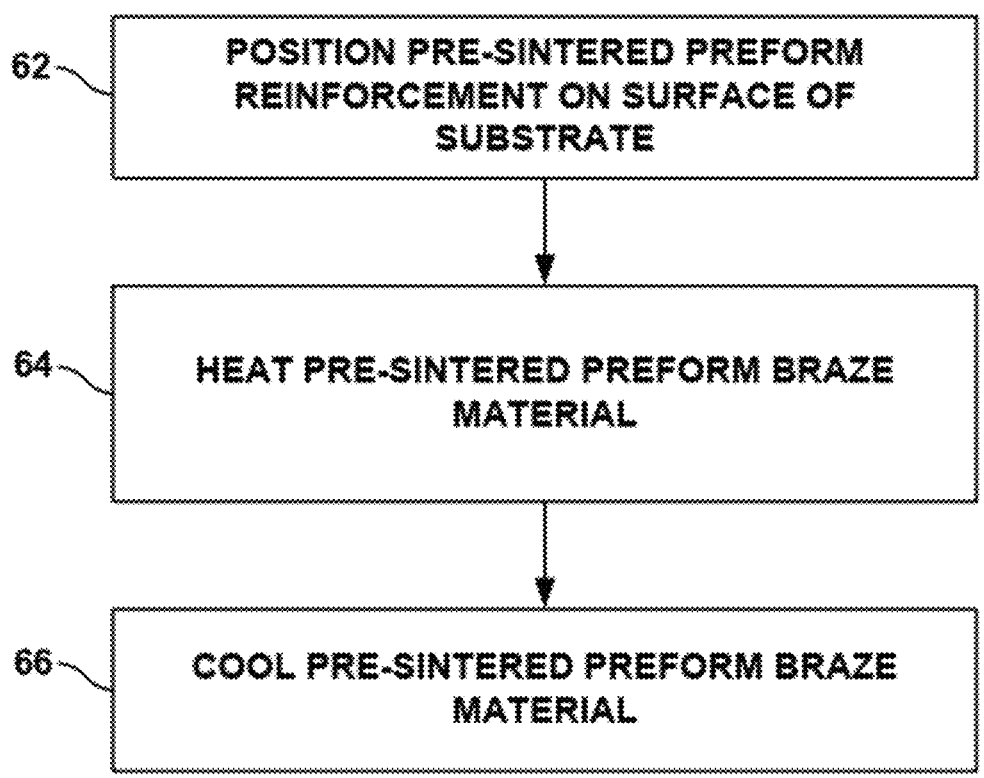
FIG. 4 is a flow diagram illustrating an example technique for forming on a substrate and reinforcement using a pre-sintered preform (PSP) braze material.

FIG. 4 is a flow diagram illustrating an example technique for forming on a substrate and reinforcement using a pre-sintered preform (PSP) braze material. Although illustrated with reference to component 10 of FIG. 1, in some examples, the technique illustrated in FIG. 4 may be used to form other components. Additionally, the technique illustrated in FIG. 4 may be used to form other components, such as outer combustion chambers 20 or 40 described above in reference to FIGS. 2A-3B.

Although not shown in FIG. 4, in some examples, prior to positioning reinforcement 14 on substrate 12 (62), the technique may include inspecting, abrading, and/or cleaning surface 16 of substrate 12. For example, in examples in which component 10 includes a outer combustion chamber, inspecting may include inspecting a metal mesh armpit patch; abrading may include mechanically removing the metal mesh armpit patch, grinding, grit blasting, or the like; and cleaning may include application of at least one of a degreaser, an acid, a reducing agent, or other metal cleaning agent suitable to prepare surface 16 of substrate 12 to receive PSP reinforcement 14. In some examples, a abraded and/or a clean surface 16 may produce a stronger bond compared to an unclean or unabraded surface.

The technique of FIG. 4 includes positioning PSP reinforcement 14 on surface 16 (62). As described above, PSP reinforcement 14 may define a predetermined shape that at least partially corresponds to the geometry of surface 16. Surface 16 may include a relatively simple geometry or a more complex geometry. In some examples, the technique may include cutting or machining PSP reinforcement 14 into shape corresponding to a contour of surface 16 of substrate 12. For example, cutting or machining PSP reinforcement 14 may include shaping PSP reinforcement 14 into a simple shape or a more complex shape including curvature, angles, apertures, or the like. PSP reinforcement 14 may be positioned on surface 16 such that at least a portion of surface 18 of PSP reinforcement 14 contacts surface 16 of substrate 12. In some examples, the technique may include using a clamp, a press, or another mechanism to compress PSP reinforcement 14 onto surface 16 to cause more intimate contact between surfaces 16 and 18 compared to not using a compression mechanism.

The technique of FIG. 4 also may include heating PSP reinforcement 14 to soften and/or melt at least part of PSP reinforcement 14 (64). For example, heating PSPS reinforcement 14 may cause at least one constituent metal or alloy of the low-melt powder to melt. In some examples, PSP reinforcement 14 may be heated in a furnace or other closed retort, and substrate 12 may be heated with PSP reinforcement 14. In some examples, the furnace or closed retort may enclose a vacuum or substantially inert atmosphere. For example, a substantially inert atmosphere may include an atmosphere including constituents that do not react with substrate 12 and PSP reinforcement 14 at the temperatures and pressures experienced by the interior of the furnace or closed retort). In some examples, PSP reinforcement 14 may be heated at a braze temperature of between about 1093° C. (about 2000° F.) and about 1288° C. (about 2350° F.), such as a braze temperatures of about 1260° C. (about 2300° F.). The time for which PSP reinforcement 14 is heated at the braze temperature may vary from about 10 minutes to about 60 minutes, for example between about 20 to 30 minutes.

Regardless of the heat treatment used for softening and/or melting at least a portion PSP reinforcement 14 (64), PSP reinforcement 14 may be allowed to cool to ambient temperature to form a solid reinforcement 14 (66). For example, PSP reinforcement 14 may be cooled in a vacuum or inert gas furnace to about 650° C. (about 1200° F.) at a rate that is slow enough to avoid thermal distortion, followed by cooled under flowing inert gas to about 65° C. (about 150° F.) or less.

Following the brazing technique illustrated in FIG. 4, the component 10 including substrate 12 and reinforcement 14 may optionally be subjected to a diffusion heat treatment cycle to homogenize an interface defined as a region adjacent to surfaces 16 and 18. For example, the diffusion heat treatment may be performed at temperatures between about 0° C. (about 0° F.) and about 222° C. (about 400° F.) below the braze temperature (e.g., below the highest braze temperature used in a stepped heat treatment), and for times of up to about 24 hours. For example, the post-brazing diffusion heat treatment cycle may include a stepped diffusion heat treatment cycle at a temperature of about 1149° C. (about 2100° F. for about 1 hour to about 18 hours. In some examples, during the diffusion heat treatment, component 10 is disposed in a vacuum or inert atmosphere.

In some examples, the stepped diffusion heat treatment cycle may include heating component 10 at a rate of between about 11° C./minute (about 20° F./minute) and about 22° C./minute (about 40° F./minute) to a first temperature of between about 982° C. (about 1800° F.) and about 1093° C. (about 2000° F.). In some examples, component 10 may be held at the first temperature for about 30 minutes to about 4 hours. The stepped heat treatment may also include heating component 10 to a second temperature of between about 1038° C. (about 1900° F.) and about 1149° C. (about 2100° F.) at a rate of between about 5.6° C./minute (about 10° F./minute) and about 16.7° C./minute (about 30° F./minute). Component 10 may be held at the second temperature for between about 1 hour and about 4 hours. In some examples, the stepped heat treatment further includes heating component 10 to a third temperature of between about 1066° C. (about 1950° F.) and about 1177° C. (about 2150° F.) at a rate of between about 2.8° C./minute (about 5° F./minute) and about 11° C./minute (about 20° F./minute). Component 10 may be held at the third temperature for between about 1 hour and about 4 hours. The stepped heat treatment also may include heating component 10 to a fourth temperature of between about 1093° C. (about 2000° F.) and about 1204° C. (about 2200° F.) at a rate of between about 2.8° C./minute (about 5° F./minute) and about 11° C./minute (about 20° F./minute). Component 10 may be held at the fourth temperature for between about 6 hours and about 24 hours.

In some examples, component 10 may be heated at a rate of about 16.7° C./minute (about 30° F./minute) a first temperature of about 1038° C. (about 1900° F.) and held at about 1038° C. for about 1 hour to about 2 hours. Component 10 then may be heated to a second temperature of about 1093° C. (about 2000° F.) at a rate of about 11° C./minute (about 20° F./minute) and held at about 1093° C. for about 1 hour to about 2 hours. Component 10 then may be heated to a third temperature of about 1121° C. (about 2050° F.) at a rate of about 5.6° C./minute (about 10° F./minute) and held at about 1121° C. for about 1 hour to about 2 hours. Component 10 then may be heated to a fourth temperature of about 1149° C. (about 2100° F.) at rate of about 5.6° C./minute (about 10° F./minute) and held at about 1149° C. for about 1 hour to about 18 hours.

In some examples, the technique may include one or more additional processing steps including, but not limited to, hot isostatic pressing, stress relief, additional sintering, solutionizing, annealing, aging, tempering, machining, polishing, shot peening, laser shock peening, or coating. The one or more additional processing steps may provide desired mechanical properties, physical properties, thermal resistance, chemical resistance, or the like.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

The following clauses illustrate example subject matter described herein.

Clause 1. A method comprising: positioning a pre-sintered preform (PSP) reinforcement on a surface of a substrate, wherein the substrate comprises at least a portion of a pressure vessel, and wherein the PSP reinforcement comprises a low-melt powder and a high-melt powder; heating the PSP reinforcement to soften or melt at least one constituent metal or alloy of the low-melt powder, wherein, during heating, the PSP reinforcement is configured to conform to a contour of the surface of the substrate; and cooling the PSP reinforcement to define a reinforced component.

Clause 2. The method of clause 1, wherein the substrate comprises at least a portion of a pressure vessel of a gas turbine engine or an outer combustion chamber of a gas turbine engine.

Clause 3. The method of clause 1 or 2, wherein the high-melt powder comprises a nickel-based alloy or an iron-based alloy.

Clause 4. The method of any one of clauses 1 through 3, wherein the low-melt powder comprises at least one of silicon or boron.

Clause 5. The method of any one of clauses 1 through 4, wherein a weight percent (wt. %) of the low-melt powder is within a range from about 20 wt. % to about 40 wt. %.

Clause 6. The method of any one of clauses 1 through 5, wherein the PSP reinforcement comprises a conforming braze material.

Clause 7. The method of any one of clauses 1 through 6, wherein the PSP reinforcement comprises between about 50 wt. % and about 90 wt. % Ni, up to about 15 wt. % Cr, up to about 10 wt. % Ta, up to about 10 wt. % Co, up to about 7 wt. % Al, up to about 4 wt. % W, up to about 2 wt. % Re, up to about 1 wt. % Mo, up to about 1 wt. % Hf, and, optionally, up to about 0.5 wt. % Nb, up to about 3 wt. % Si, and up to about 3 wt. % B.

Clause 8. The method of any one of clauses 1 through 7, wherein the method further comprises, during heating, applying compression to a surface of the PSP reinforcement.

Clause 9. The method of any one of clauses 1 through 8, wherein the method further comprises, before positioning the PSP reinforcement, shaping a surface of the PSP reinforcement to substantially correspond to the surface of the substrate.

Clause 10. The method of any one of clauses 1 through 9, wherein heating the
PSP reinforcement comprises heating the PSP reinforcement in a vacuum furnace at a temperature between about 1093° C. and about 1260° C.

Clause 11. The method of any one of clauses 1 through 10, further comprising, after cooling the molten braze alloy to join the first and second components, heat treating the first and second components using a stepped diffusion cycle by at least heating the first and second components to about 1038☐C for about 1 hour to about 2 hours; heating the first and second components to about 1093☐ for about 1 hour to about 2 hours; heating the first and second components to about 1121☐C for about 1 hour to about 2 hours; heating the first and second components to about 1149☐C for about 1 hour to about 18 hours; and cooling the first and second components to room temperature.

Clause 12. A component comprising: a substrate comprising at least a portion of a pressure vessel, wherein the substrate defines a contoured exterior surface of the pressure vessel; and a pre-sintered preform (PSP) reinforcement formed on the surface of the substrate by brazing, wherein the PSP reinforcement comprises a low-melt powder and a high-melt powder.

Clause 13. The component of clause 12, wherein the substrate comprises at least a portion of a pressure vessel of a gas turbine engine or an outer combustion chamber of a gas turbine engine.

Clause 14. The component of clause 12 or 13, wherein the high-melt powder comprises a nickel-based alloy or an iron-based alloy.

Clause 15. The component of any one of clauses 12 through 14, wherein the low-melt powder comprises at least one of silicon or boron.

Clause 16. The component of any one of clauses 12 through 15, wherein a weight percent (wt. %) of the low-melt powder is within a range from about 20 wt. % to about 40 wt. %.

Clause 17. The component of any one of clauses 12 through 16, wherein the reinforcement comprises between about 50 wt. % and about 90 wt. % Ni, up to about 15 wt. % Cr, up to about 10 wt. % Ta, up to about 10 wt. % Co, up to about 7 wt. % Al, up to about 4 wt. % W, up to about 2 wt. % Re, up to about 1 wt. % Mo, up to about 1 wt. % Hf, and, optionally, up to about 0.5 wt. % Nb, up to about 3 wt. % Si, and up to about 3 wt. % B.

Clause 18. An assembly comprising: a substrate defining a surface of at least a portion of a pressure vessel; and a pre-sintered preform (PSP) reinforcement positioned on the surface of the substrate, wherein the PSP reinforcement comprises a low-melt powder and a high-melt powder; and a heat source configured to heat the PSP reinforcement to soften or melt at least one constituent metal or alloy of the low-melt powder, wherein, during heating, the PSP reinforcement is configured to conform to a contour of the surface of the substrate.

Clause 19. The assembly of clause 18, further comprising means to compress the PSP reinforcement onto the surface of the substrate.

Clause 20. The assembly of clause 18 or 19, wherein the substrate comprises at least a portion of a pressure vessel of a gas turbine engine or an outer combustion chamber of a gas turbine engine.

Various examples have been described. These and other examples are within the scope of the following claims.

What is claimed is:

1. A component comprising:
a substrate comprising at least a portion of a pressure vessel of a gas turbine engine or an outer combustion chamber of a gas turbine engine, wherein the substrate defines a contoured exterior surface; and
a pre-sintered preform (PSP) reinforcement formed over a welded seam on an undamaged surface of the substrate by brazing, wherein the PSP reinforcement comprises a low-melt powder and a high-melt powder, and wherein the PSP reinforcement defines a thickness within a range of from about 0.381 millimeters (mm) to about 25.2 mm.

2. The component of claim 1, wherein the high-melt powder comprises a nickel-based alloy or an iron-based alloy.

3. The component of claim 1, wherein the low-melt powder comprises at least one of silicon or boron.

4. The component of claim 1, wherein a weight percent (wt. %) of the low-melt powder is within a range from about 20 wt. % to about 40 wt. %.

5. The component of claim 1, wherein the reinforcement comprises between about 50 wt. % and about 90 wt. % Ni, up to 15 wt. % Cr, up to 10 wt. % Ta, up to 10 wt. % Co, up to 7 wt. % Al, up to 4 wt. % W, up to 2 wt. % Re, up to 1 wt. % Mo, up to 1 wt. % Hf, up to 0.5 wt. % Nb, up to 3 wt. % Si, and up to 3 wt. % B.

6. An assembly comprising:
a substrate comprising at least a portion of a pressure vessel of a gas turbine engine or an outer combustion chamber of a gas turbine engine;
a pre-sintered preform (PSP) reinforcement formed over a welded seam on an undamaged surface of the substrate, wherein the PSP reinforcement comprises a low-melt powder and a high-melt powder, and wherein the PSP reinforcement defines a thickness within a range of from about 0.381 millimeters (mm) to about 25.2 mm; and
a heat source configured to heat the PSP reinforcement to soften or melt at least one constituent metal or alloy of the low-melt powder,
wherein, during heating, the PSP reinforcement is configured to conform to a contour of the surface of the substrate.

7. The assembly of claim 6 further comprising means to compress the PSP reinforcement onto the surface of the substrate.

8. The assembly of claim 6, wherein the high-melt powder comprises a nickel-based alloy or an iron-based alloy.

9. The assembly of claim 6, wherein the low-melt powder comprises at least one of silicon or boron.

10. The component of claim 6, wherein a weight percent (wt. %) of the low-melt powder is within a range from about 20 wt. % to about 40 wt. %.

11. The component of claim 6, wherein the reinforcement comprises between about 50 wt. % and about 90 wt. % Ni, up to 15 wt. % Cr, up to 10 wt. % Ta, up to 10 wt. % Co, up to 7 wt. % Al, up to 4 wt. % W, up to 2 wt. % Re, up to 1 wt. % Mo, up to 1 wt. % Hf, up to 0.5 wt. % Nb, up to 3 wt. % Si, and up to 3 wt. % B.

* * * * *